Nov. 13, 1945.   E. BAGNALL   2,389,017
STABILIZER
Filed Oct. 29, 1941
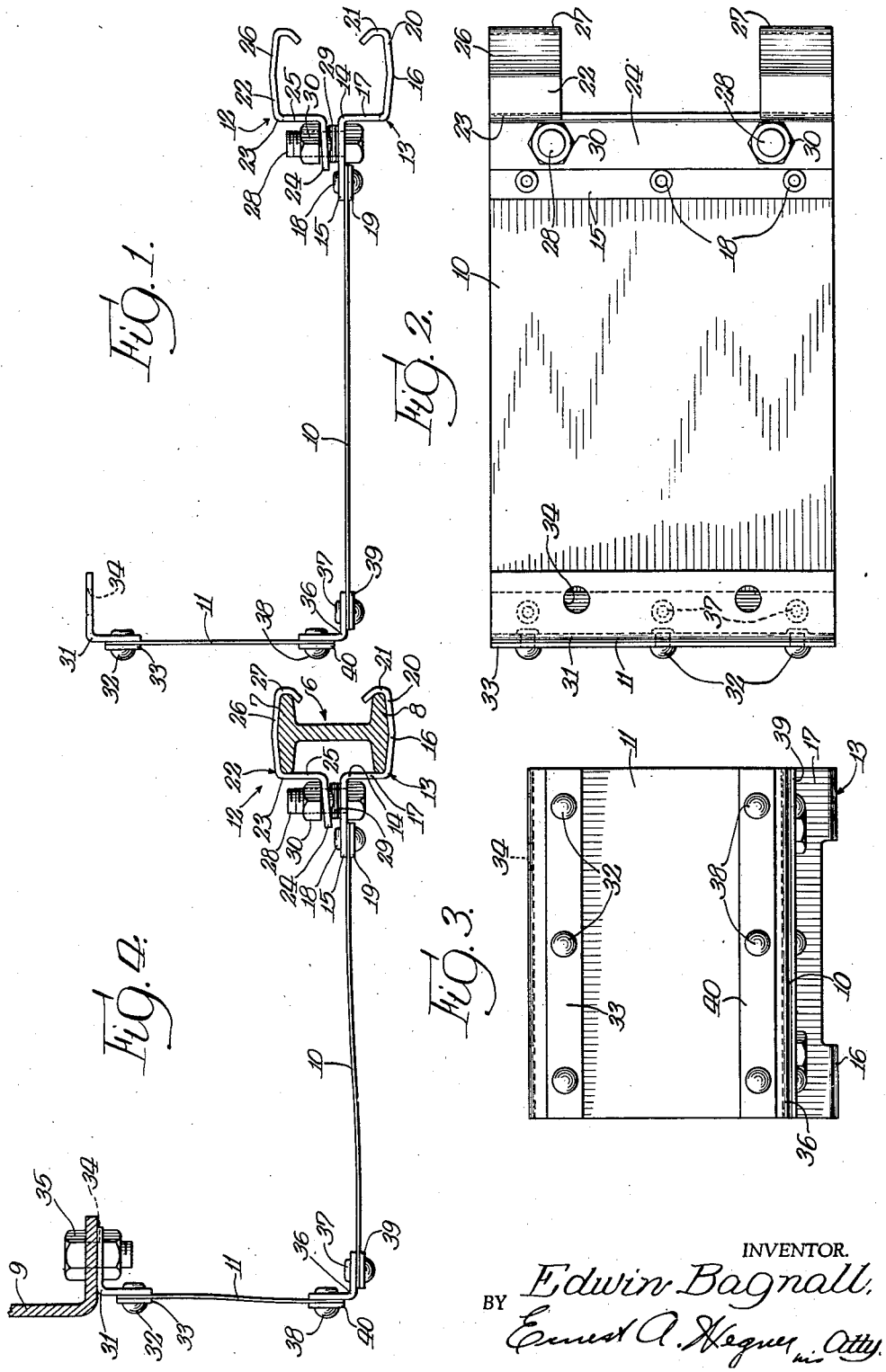
INVENTOR.
Edwin Bagnall.
BY Ernest A. Wegner, his Atty.

Patented Nov. 13, 1945

2,389,017

UNITED STATES PATENT OFFICE 2,389,017

STABILIZER

Edwin Bagnall, Chicago, Ill.

Application October 29, 1941, Serial No. 416,945

15 Claims. (Cl. 267—67).

The invention relates generally to a stabilizer for a spring supported body and more particularly to a stabilizer for vehicles, being generally of the type disclosed and claimed in the copending application of Edwin Bagnall, Serial No. 364,509, filed November 6, 1940, now Patent No. 2,357,299, issued September 5, 1944.

The stabilizer of the above identified application is particularly adapted for use where, in the applied condition of the stabilizer the elements thereof form certain angles with one another, more particularly, where with one element taken as the base or zero line the other element falls within the range 0° to 45°, or 0° to 315°, or 180° from that range, namely, in the range 135° to 225°. It is an object of this invention to provide a stabilizer wherein, in the applied condition of the stabilizer, and assuming one element to constitute a zero line, the other element would fall in the range 45° to 135°, or 225° to 315°.

Another object is to provide a stabilizer of the character described providing, when applied to a vehicle, increased resistance to sidewise tilting of the vehicle body relative to the axle.

A further object is to provide a stabilizer of the character described in which one element acts as a strut for the other element, increasing resistance of the stabilizer to forces tending to twist the attaching ends of the stabilizer relative to one another.

Other objects and advantages will become apparent from the following detailed description taken in connection with the accompanying drawing, in which:

Fig. 1 is a side elevational view of a stabilizer embodying the features of this invention.

Fig. 2 is a top plan view of the stabilizer of Fig. 1.

Fig. 3 is a left end view of the stabilizer of Fig. 1.

Fig. 4 is a side elevational view showing the stabilizer in applied position.

The stabilizer of the invention is applicable to a variety of spring supported bodies, but finds its primary application to vehicles of all kinds having bodies spring supported on an undercarriage structure. Such vehicles include railway and street cars, as well as automobiles, and may have a full width axle and transverse or semi-elliptical springing or partial axles and coil springing. The vehicles also have either a transverse frame member displaced longitudinally of the vehicle with respect to the axle or some longitudinally extending frame member providing a point of attachment for the stabilizer displaced longitudinally of the vehicle with respect to the axle. While the stabilizer will hereinafter be described as applied to such a relative transverse member and full width axle construction, it is not intended that the invention is to be limited to the specific construction disclosed nor even to use on a vehicle. On the contrary it is intended to cover all uses or adaptations and all modifications or alternative constructions falling within the scope and spirit of the invention as defined in the appended claims.

For exemplary purposes, the stabilizer is herein disclosed as applied to a vehicle. Accordingly, there is shown in Fig. 4 an axle 6 of conventional I-beam shape in cross section, providing upper and lower flanges 7 and 8, respectively, while 9 represents a member or part of the chassis frame structure of the vehicle with respect to which the axle is to be restricted against certain undesirable movements. It is to be understood that interposed between the axle 6 and the chassis frame structure are suitable and conventional spring means not here shown.

The stabilizer comprises a pair of leaf elements 10 and 11 interconnected at one of their ends and attached at the remaining ends one to the axle 6 and the other to the member 9. The elements 10 and 11 are of a high quality, resilient metal, preferably spring steel, and each is made relatively thin so as to be readily flexible in a direction normal to its plane. At the same time each element is made comparatively wide so as to offer tremendous resistance to bending moments in the plane of the element. By way of example, the thickness of the elements may be the order of one-thirty-second of an inch, while the width of the elements is in the order of six inches.

As previously stated, one of the elements is adapted for attachment to the axle 6. Herein the element 10 is shown so attached. For the purpose of firmly attaching the element to the axle, with the element extending longitudinally of the vehicle, i. e., transversely of the axle, and disposed with its width transversely of the vehicle, i. e., horizontally, the element 10 carries an attaching means, generally designated 12. This means takes the form of a double jawed clamp, the main jaw 13 of which comprises a plate 14 having a length equal to the width of the element 10. The plate 14 has two substantially right angle bends to give to the plate two substantially parallel flange portions 15 and 16 and an intermediate offsetting portion 17. The flange portion 15 is secured to the end of the element 10 by means of rivets 18, this attachment being reinforced by a narrow strip 19 placed on the opposite face of the element 10. The rivets 18 pass through both the strip 19 and the flange portion 15 to draw the same into tight clamping relationship, producing a frictional force carrying a part of the shear load which would otherwise be carried entirely by the rivets 18. To save material and lighten the construction, the portion 16 is preferably cut out in the middle, as best seen in Fig. 3, to form a pair of fingers 20. In order securely to engage the flange 8, each finger is formed with a hook 21.

A complementary jaw 22 is formed by a plate 23 generally similar to the plate 14 having a flange portion 24, an offsetting portion 25 and a pair of fingers 26 each terminating in a hook 27. The flange portion 15 and the flange portion 24 are each formed with a pair of apertures through which bolts 28 project for clamping the jaws tightly on the axle 6. A speed nut 29 retains the bolt 28 in the main jaw to facilitate application of the stabilizer, and the flange 24 forms an angle slightly greater than a right angle with the offsetting portion 25, in order that it may be disposed to hold the nut 30 against loss without necessity of providing a lock washer.

The element 11 is adapted for connection to the member 9 in a manner to have an effective point of attachment different from the actual point of engagement with the chassis frame structure and to that end carries an attaching means which here takes the form of an angle plate 31. One leg of the plate 31 is secured as by rivets 32 to the end of the element 11. A reinforcing strip 33 is again applied to the opposite face of the element 11 for the reasons pointed out in connection with the plate 19. The remaining leg is formed with a pair of apertures 34 for the reception of bolts 35 by means of which the plate is secured to the member 9.

The element 11 herein is, in both the unapplied and applied condition of the stabilizer disposed to make an angle of from 45° to 135° with the element 10, in fact, it is substantially normal to the element 10. While the elements 10 and 11 might be formed of a single strip of metal, they are preferably formed as individual elements and interconnected at their ends. Herein the means for interconnecting the elements includes an angle plate 36, one leg or flange of which is secured by rivets 37 to the end of the element 10, and the other flange or leg is secured by rivets 38 to the element 11. Reinforcing strips 39 and 40 are again provided to afford a frictional connection taking a portion of the shear load which would otherwise be carried entirely by the rivets 37 and 38.

In the unapplied condition of the stabilizer, the elements 10 and 11 are strictly at right angles to one another. For improved operation, the elements 10 and 11 are given a length slightly greater, respectively, than the horizontal and vertical spacings of the axle 6 and member 9 to be interconnected by the stabilizer. As a result, when the stabilizer is applied, each of the elements 10 and 11 will be slightly flexed, as best seen in Fig. 4.

With this disposition of the elements, the stabilizer still is free of pivot joints which wear and provide play, and still provides a free point in the stabilizer for taking up the shortening or elongation of the distances between the points of attachment of the stabilizer as the member 9 moves relative to the axle 6 under flexing of the springs interposed between the axle and the chassis frame structure. Though this free point is provided, and though the ready flexing of the element 10 in a direction normal to its plane permits the free normal vertical movement of the axle relative to the chassis, the stabilizer is stiffened to offer increased resistance to certain other types of movement which are not desirable, particularly to sidewise tilting of the vehicle relative to the axle. This results from the fact that each element, because of the right angular relationship, now acts as a strut for the other element. Any tendency of the axle 6 to shift transversely of the vehicle is effectively restrained, since the primary force set up by such a tendency to shift transversely is a shearing force between the elements acting transversely of the vehicle and the stabilizer, and thus in the direction of the width of both elements 10 and 11. A tendency of the vehicle body to tilt sidewise with respect to the axle 6 is, however, resisted to a greater degree than by a stabilizer of the kind disclosed in the above identified Bagnall application, because such movement is permitted only by the twisting of the element 10, which is reinforced against such twisting by the strut effect of the element 11. Moreover, in the former construction both elements were disposed to permit of such twisting giving twice the permissible movement.

I claim as my invention:

1. A stabilizer for use with a vehicle comprising a thin comparatively wide leaf element of spring steel, means carried by one end of said element for attachment to an axle of the vehicle with the element extending longitudinally of the vehicle and disposed in a substantially horizontal plane, a second thin comparatively wide leaf element of spring steel disposed at a right angle with said first mentioned element, means on one end of said second element for a rigid attachment to the chassis frame structure of the vehicle, and a right angle plate rigidly interconnecting the remaining ends of said elements.

2. A stabilizer for a vehicle comprising a first thin and wide leaf element readily flexible in a direction normal to its plane and resisting bending moments in its plane, means carried by one end of said element for rigid attachment of the element to an axle of the vehicle with the element extending longitudinally of the vehicle and with its width in the direction of the axle, a second thin and wide leaf element readily flexible in a direction normal to its plane and resisting bending moments in its plane disposed substantially normal to said first element with its width in the direction of the width of said first element, means for rigidly interconnecting the ends of said elements, and means carried by the remaining end of said second element for rigid attachment to the chassis frame structure of the vehicle.

3. A stabilizer for use with a vehicle comprising a first element readily flexible in one direction and resisting bending moments at right angles to said first mentioned direction, means carried by one end of said element for rigid attachment of the element to an axle of the vehicle with the element extending longitudinally of the vehicle and disposed to permit ready movement of the axle toward and away from the chassis frame structure of the vehicle, a second element readily flexible in one direction and resisting bending moments in a direction at right angles to the first direction disposed generally normal to said first element and to be readily flexible in a direction longitudinally of the vehicle, means carried by one end of said element for rigid attachment to the chassis frame structure of the vehicle, and means for rigidly interconnecting the remaining ends of said elements.

4. A transverse, nonload carrying stabilizer for a vehicle, a first portion, a second portion rigid with said first portion and disposed to form an angle therewith in the range 45° to 135°, each of said portions being so readily flexible in one direction as to be incapable of functioning as a spring in a vehicle and resistant to bending moments acting in a direction at right angles to the direction of flexing of the portions, means carried by the remaining end of one of said portions for rigid attachment to an axle of the vehicle with the stabilizer extending longitudinally of the vehicle, and the remaining end of said other portion carrying means for attachment thereof to the chassis frame structure of the vehicle.

5. Connecting means between a vehicle frame element and an axle element comprising a pair of elements rigidly interconnected generally normal to one another and rigidly connected with the frame and axle elements, said elements being so resiliently flexible in a direction permitting vertical movement of the axle element relative to the frame element as to prform no load carrying function and resisting movement of the axle element transversely of the vehicle.

6. Non-load carrying connecting means between a vehicle frame element and an axle element rigidly connected at its ends to the frame and axle elements and comprising rigidly interconnected, generally right angular portions, one of the portions being resiliently flexible in a direction to permit vertical movement of the axle element, the other of the portions being resiliently flexible in a direction to offer inconsequential resistance to the movement of the axle element longitudinally of the vehicle, and both portions being substantially rigid in a direction normal to the direction in which the first portion is flexible and parallel to the axle element.

7. Connecting means between a vehicle frame element and an axle element comprising a first element rigidly connected with the axle element and extending longitudinally of the vehicle, a second element rigidly connected with the frame element and so flexible in a direction longitudinally of the vehicle as to prevent the connecting means from performing any radius rod function, the first and second elements being rigidly interconnected to form an angle in the range of 45° to 145° and at least said first element being so flexible in a direction to permit vertical movement of the axle element that the means performs no load carrying function, with the connecting means as a whole resistant to movement of the axle transversely of the vehicle.

8. A stabilizer for use with a vehicle comprising a first element readily flexible in one direction and resisting bending moments at right angles to said first mentioned direction, means carried by one end of said elements for rigid attachment of the element to the undercarriage of the vehicle with the element extending longitudinally of the vehicle and disposed to permit ready movement of the undercarriage toward and away from the chassis frame structure of the vehicle, a second element readily flexible in one direction and resisting bending moments in a direction at right angles to the first direction disposed transversely of and generally normal to said first element and to be readily flexible in a direction longitudinally of the vehicle, means carried by one end of said element for rigid attachment to the chassis frame structure of the vehicle, and means for rigidly interconnecting the remaining ends of said elements.

9. Connecting means between a vehicle frame element and an undercarriage structure comprising a pair of element portions rigidly interconnected generally normal to one another and rigidly connected with the frame element and the undercarriage structure, said portions being so resiliently flexible in a direction permitting vertical movement of the undercarriage structure relative to the frame element as to perform no load carrying function and resisting movement of the undercarriage structure transversely of the vehicle.

10. Connecting means between a vehicle frame element and an undercarriage structure comprising a first relatively wide and thin leaf element resiliently flexible normal to the plane of the element but resisting bending moments in the plane of the elements, means rigidly connecting one end of the element to the undercarriage structure with the element disposed longitudinally of the vehicle with its width extending transversely of the vehicle, a second comparatively wide and thin leaf element disposed transversely of said first element generally normal thereto and rigidly interconnected with the remaining end of said first element, and means for connecting the remaining end of said second element to the frame element.

11. Connecting means between a spring supported body and a base structure comprising a pair of leaf elements rigidly interconnected generally normal to one another and rigidly connected with the body and the base structure, said elements being wide compared to their thickness so as to be so resiliently flexible in a direction permitting relative movement of the body and base structure in a line through the body and the base structure as to perform no load carrying function but resisting relative movement between the body and base structure in one direction parallel to each other.

12. A stabilizer for use with a vehicle having a chassis frame structure, an undercarriage structure and spring means interposed therebetween comprising a first sheet element, attaching means at one end of said element for rigid attachment to the undercarriage structure with said element disposed flatwise and extending generally longitudinally of the vehicle, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure providing an effective point of attachment of said second element different from the actual point of engagement of said attaching means with the chassis frame structure.

13. A stabilizer for use with a body spring supported from a base structure comprising a first sheet element, attaching means at one end of said element for rigid attachment to the base structure with said element disposed flatwise and extending in a direction generally transversely of the direction of relative movement between the body and the base structure as to be reduced by the stabilizer, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the body providing an effective point of attachment of said second element different from the actual point of engagement of said attaching means with the body.

14. A stabilizer for use with a body spring supported from a base structure comprising a first sheet element, attaching means at one end of said element for rigid attachment to the base structure with said element disposed flatwise and extending in a direction generally transversely of the direction of relative movement between the body and the base structure as to be reduced by the stabilizer, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the body having an extending portion to the end of which said second element is rigidly secured.

15. A stabilizer comprising a first sheet element, attaching means at one end of said element, a second sheet element rigid with the remaining end of said first element extending transversely thereof and disposed generally normal thereto, each of said elements being readily flexible in a direction normal to its plane but resisting bending moments in its plane, and attaching means at the remaining end of said second element providing an effective point of attachment of said second element different from the actual point of attachment of said attaching means.

EDWIN BAGNALL.